(12) United States Patent
Freudelsperger

(10) Patent No.: US 6,293,635 B1
(45) Date of Patent: Sep. 25, 2001

(54) ITEMS CHANGING MAGAZINE

(75) Inventor: Karl Freudelsperger, Graz (AT)

(73) Assignee: Knapp Logistik Automation Gesellschaft m.b.H., Hart Bei Graz (AT)

( * ) Notice: Subject to any disclaimer, the term of this patent is extended or adjusted under 35 U.S.C. 154(b) by 0 days.

(21) Appl. No.: 09/380,085

(22) PCT Filed: Feb. 23, 1998

(86) PCT No.: PCT/AT98/00037

§ 371 Date: Aug. 27, 1999

§ 102(e) Date: Aug. 27, 1999

(87) PCT Pub. No.: WO98/38119

PCT Pub. Date: Sep. 3, 1998

(30) Foreign Application Priority Data

Feb. 27, 1997 (AT) .......................................... 340/97

(51) Int. Cl.⁷ ................. A47F 1/00; B65G 1/16
(52) U.S. Cl. ............................. 312/42; 312/35
(58) Field of Search .................. 312/35, 42, 50, 312/60, 61, 71, 9.9, 9.47, 9.48, 9.52, 223.1, 223.2; 206/387.1, 387.14, 387.15; 221/197, 198, 287

(56) References Cited

U.S. PATENT DOCUMENTS 2,272,682   2/1942   Srodulski .
3,409,110   11/1968  Baum .

FOREIGN PATENT DOCUMENTS 42 25 041A   2/1994   (DE) .
0 165 918 A  12/1985  (EP) .
   969871 *  9/1964   (GB) ..................................... 312/42

* cited by examiner

Primary Examiner—Peter M. Cuomo
Assistant Examiner—James O. Hansen
(74) Attorney, Agent, or Firm—Sughrue, Mion, Zinn, Macpeak & Seas, PLLC

(57) ABSTRACT

An exchangeable magazine (1) for a storage shelf (54) comprises two side walls (3, 4) interconnected via webs (5), superimposed items (2) being stacked therebetween, the side walls (3, 4) including lower, inwardly angled end portions (17) for supporting the item stack. To adapt the magazine to different dimensions of the items (2), the mutual distance of the side walls (3, 4) is adaptable to the width (B) of the items (2) by aid of the webs (5) wherein on at least one side wall (3, 4), at least one guide rail (18) extending in parallel to the side walls (3, 4) and capable of engaging the item stack over the height thereof is mounted to be displaceable in the direction of the depth (T) of the items (2).

19 Claims, 4 Drawing Sheets

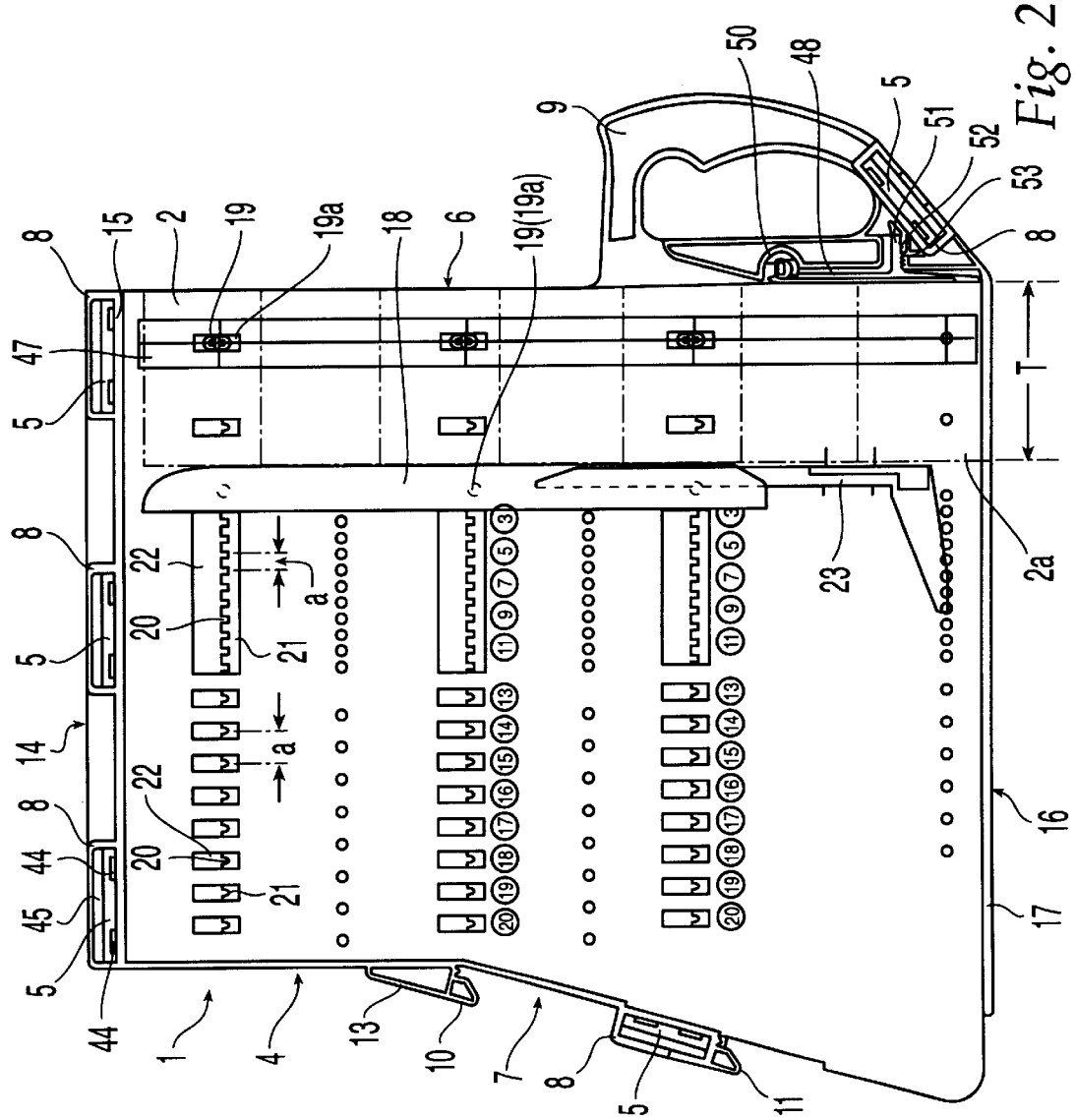
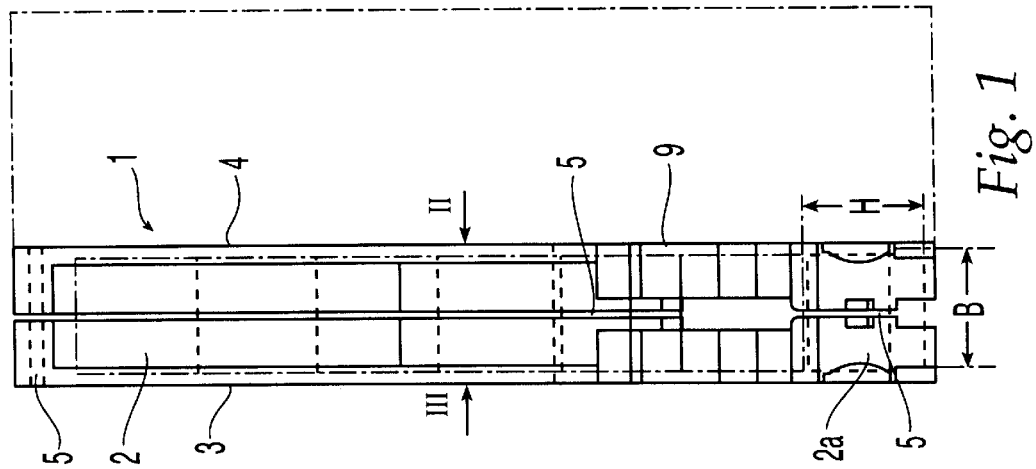

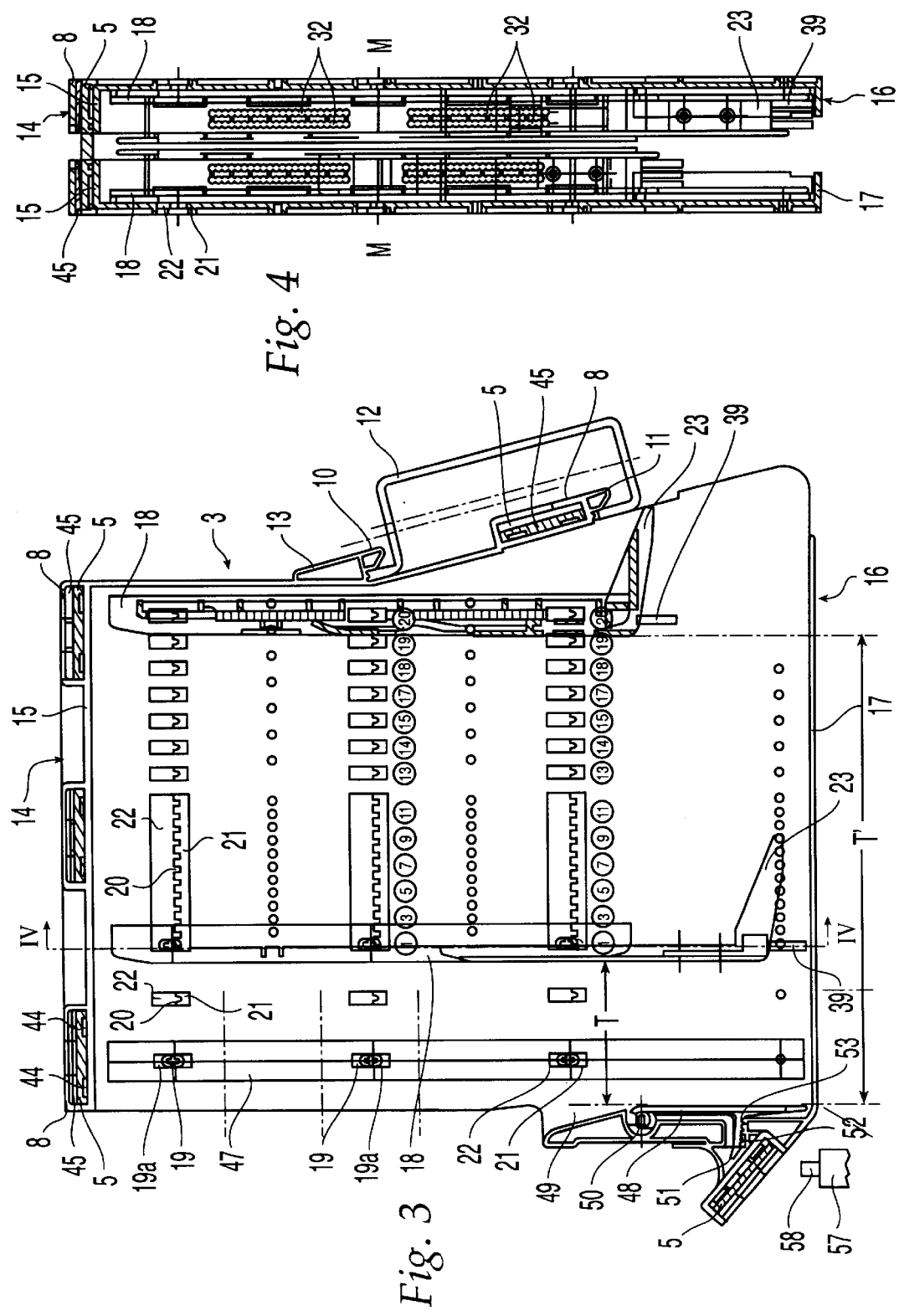

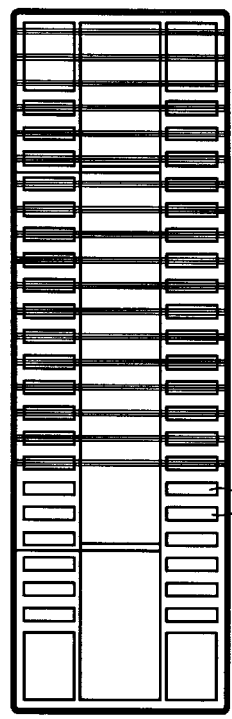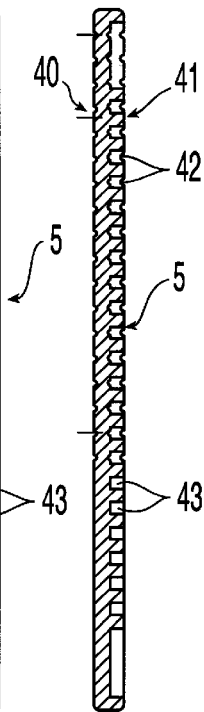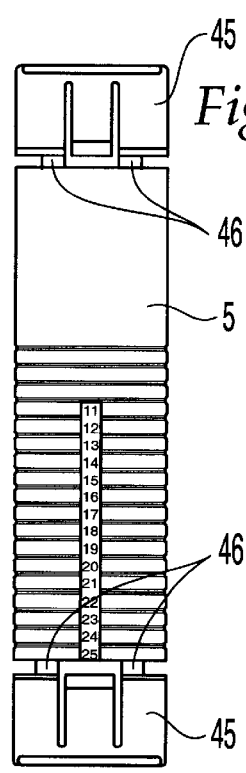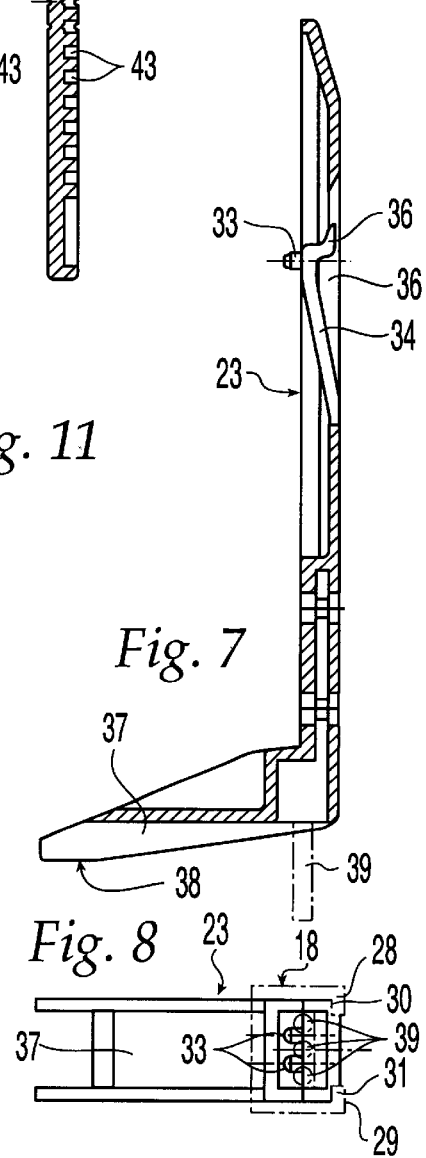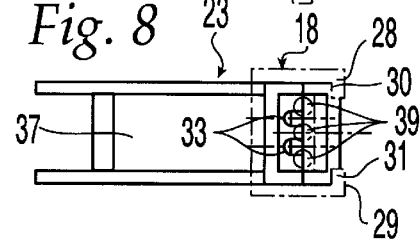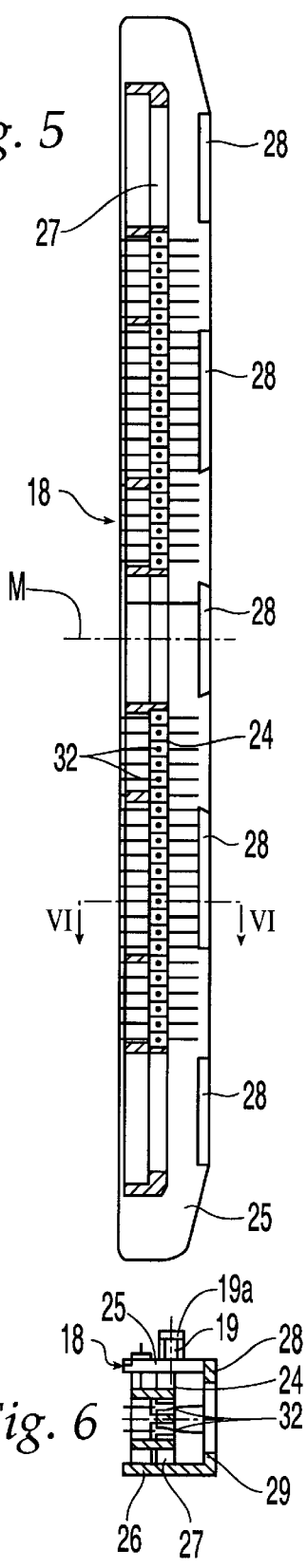

ITEMS CHANGING MAGAZINE

The invention relates to an exchangeable item magazine for a storage shelf comprising two side walls interconnected via webs, superimposed items being stacked therebetween, the side walls including lower-inwardly angled end sections for supporting the item stack.

A magazine of this type is known from DE 42 25 041 A1. This magazine is used in commissioning devices and is provided for storing items of the same type, such as sound carriers, books, boxes or the like, and is adapted to the dimensions thereof. Thus, a specific magazine must be used for respective items of different dimensions, whereby, disadvantageously, a corresponding number of different magazines is required or has to be kept on stock.

The invention has as its object to provide a magazine of the initially defined type, which can quickly and simply be adapted to the dimensions of different items.

In a magazine of the afore-mentioned type, this object is achieved in that the mutual distance of the side walls is adapteable to the width of the items by aid of the webs and that at least on one side wall, at least one guide rail extending in parallel to the side walls and capable of engaging the item stack over the height thereof is mounted to be displaceable in the direction of the depth of the item. In this manner, the magazine can quickly be adapted to the dimensions of the items. Thus it is also possible in an advantageous manner that the items are filled into the magazines already at the producer's, and the filled magazines then are delivered or can be stored ready for delivery at any time, only a small number of differently sized magazines (e.g. only two different sizes) being required.

It is also advantageous if a guide ledge is arranged within the guide rail so as to be displaceable in direction of the height of the items. Thus it is also possible to quickly define the height of a discharge opening formed by the guide ledge and provided for the lowermost item by means of the displaceable guide ledge or adapt it to the height of the items, respectively.

A particularly suitable and simple connection between the side walls consists in that the webs are releasably connected with at least one side wall. This also allows for a quick assembly of the magazine.

To adapt the magazine to the width of the items, an advantageous embodiment consists in that the webs have pre-determined breaking points transversely to their longitudinal direction so as to obtain different lengths thereof, whereby a targeted breaking down of the webs to a pre-determined length is enabled.

A particularly suitable, stable, breaking-resistant embodiment of the webs can be obtained by making the webs of glass-fiber-reinforced plastics material; preferably, the webs have V-shaped notches as pre-determined breaking points on at least one flat side thereof, so that then nevertheless the webs may simply be broken to length without the aid of a tool.

To connect the webs with the side walls in a stable manner, it is provided for the webs to have indentations which can form a positive connection with corresponding projections provided on the side walls.

It has proven particularly suitable if the projections are formed within hollow sections at the side walls into which the webs are insertable and fixable, and if the webs are fixable in the hollow section by means of a wedge. By this embodiment, a structurally stable assembly of the magazine is attained.

To allow for a rapid adaptation of the magazine to the depth of the items, it is advantageous if the guide rail is connected with the (respective) side wall via a snap connection.

In this respect, an advantageous embodiment consists in that pins attached to the guide rail are provided as snap connections, which are each capable of being snapped into a respective indentation of several rows of corresponding indentations provided in the side wall. By this sunk arrangement of the indentations in the side wall the risk of damaging the package of the item or the item itself by projecting parts is eliminated.

A structurally simple and suitable arrangement of the indentations can be obtained in that the indentations are formed in ledges which are arranged in holes of the side walls.

To secure the guide rail in its position transversely to the side-walls, it is also advantageous if the pins have a head which is widened in the longitudinal direction of the guide rail.

In a further development of the magazine it is provided that the guide ledge is held in its respective position within the guide rail in positive connection, whereby a discharge opening of precisely defined height is provided for the lowermost item.

According to a preferred embodiment it is provided that the guide rail is formed with a generally C-shaped cross-section and comprises a transverse member between its legs which is abutted by the guide ledge and which includes bores to accommodate one or several pin(s) resiliently attached to the guide ledge, whereby the guide ledge is held in positive connection and displaceable within the guide rail and is fixable therein.

It is particularly suitable in this context if the guide ledge comprises a hole in which a resilient tongue is arranged which carries the pin(s) so that the connection between the guide rail and the guide ledge can be released by hand by bending back the resilient tongue.

It has also proven particularly suitable if the guide ledge is angled at its lower end thereby forming an inclined ramp portion. In this manner, the uppermost item is particularly gently aligned in the direction towards discharge when being pushed out of the magazine in case its forward front side should be upright.

It is also advantageous if bristle bundles are attached at the lower end of the guide ledge. In this manner it can be prevented that the items slide out of the magazine automatically, particularly if only a few items are left in the magazine.

For an additional adaptation of the magazine to the width of the items it is advantageously provided that a slide rail extending in parallel to the guide rail is detachably mounted on the side wall in the region of the rear side of the magazine. This makes it possible to either provide a slide rail in each side wall or merely in one side wall or none at all.

For further adapting the magazine to the depth of the items, it is also suitable if, at the rear side of the magazine, an adjustment lever is pivotably mounted on a shaft and fixable in its position.

To facilitate handling of the magazine, it is also advantageous if a handle is attached on at least one side wall.

The invention will now be explained in more detail by way of preferred exemplary embodiments illustrated in the drawings to which, however, it is not to be restricted.

FIG. 1 shows a front view of an exchangeable magazine consisting of two side walls interconnected by webs;

FIG. 2 shows a side view of the magazine according to FIG. 1 according to arrow II of FIG. 1;

FIG. 3 shows a partially sectioned view from the other side, according to arrow III of FIG. 1;

FIG. 4 shows a section according to line IV—IV of FIG. 3;

FIG. 5 shows a partially sectioned side view of a guid rail for the magazine;

FIG. 6 shows a section according to line VI—VI of FIG. 5;

FIG. 7 shows a section of a guide ledge guided in the guide rail according to FIG. 6;

FIG. 8 shows a top view onto the guide ledge according to FIG. 7;

FIG. 9 is a top view onto a web;

FIG. 10 shows a side view of a web according to FIG. 9;

FIG. 11 shows a top view onto a pre-fabricated web; and

Figure 12:
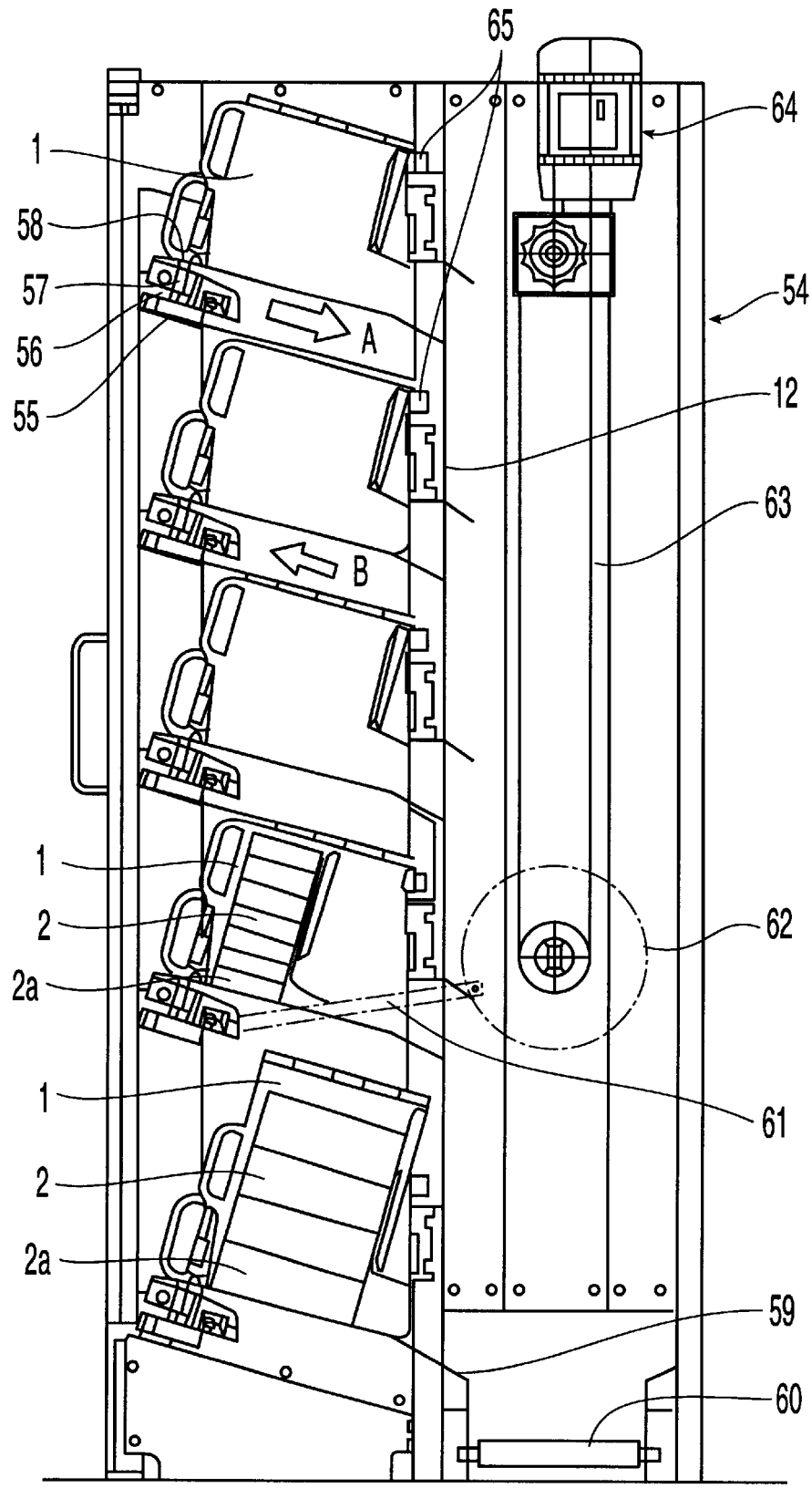
FIG. 12 shows a schematical side view of a shelf for a commissioning device comprising exchangeable magazines.

In FIGS. 1 and 2, 1 refers to an exchangeable magazine for items 2 at present considered as particularly preferred, said items being arranged in superimposed relationship—as is illustrated in dot-and-dash lines in FIG. 1—between two side walls 3, 4 consisting of plastics material, preferably ABS, which are interconnected via five webs 5, as can be seen more precisely in FIG. 2, three webs 5 being arranged on the upper side 14 of the side walls 3, 4, and one respective web 5 being arranged on each one of the rear side 6 and the front side 7 of the side walls 3, 4 or fastend in hollow sections 8, respectively, as will be explained in more detail further below. To the side wall 4 illustrated on the right-hand side in FIGS. 1 and 2, a handle 9 is moulded at the rear side 6 in the lower portion thereof so as to facilitate handling of the magazine 1, one of the hollow sections 8 simultaneously being formed in the handle 9 for acommodating one of the webs 5. In addition thereto, an additional handle 9 (not illustrated, yet cf. FIG. 12) may be provided at the left-hand side wall 3 at the rear side 6 thereof, e.g. in its upper portion.

To mount the magazine 9 on a shelf, two downwardly directed hooks 10, 11 are provided on the front side 7 of the side walls 3, 4 which can be suspended in a section rail 12 (cf. FIG. 3) of a storage shelf, the lower hook 11 being moulded to the hollow section 8, whereas the upper hook 10 is moulded to a hollow section 13.

The three hollow sections 8 formed at the upper side 14 of the magazine 1 or of the side walls 3, 4 are moulded to an upper ledge 15 which extends over the entire depth of the side walls, cf. also FIGS. 3 and 4 in addition to FIG. 2, which ledge is opposed by a lower ledge 17 moulded to the lower side 16 of the magazine or to the side walls 3, 4, respectively, so as to upwardly and downwardly delimit the clear space for the items 2, the lower ledge 17 serving as a support for the lowermost item 2a.

By using correspondingly long webs 5, the magazine 1 may be widened, as is indicated in dot-and-dash lines in FIG. 1, thus allowing for an adaptation of the magazine 1 to the width B of the items 2.

To also provide for a support of the superimposed items 2 within the magazine 1, which is adaptable to the respective depth T of the items, guide rails 18 (cf. FIGS. 2, 3 and 4) are provided in each side wall 3, 4 extending in parallel to the front sides of the items 2 and to the side walls 3, 4, which guide rails 18 consist of plastics material, PC, e.g., and are arranged to be displaceable in the direction of the depth T of the items 2, two guide rails 18 being illustrated in FIG. 3 correspondingly displaced for the different depths T and T', for a better understanding. For this purpose, three fastening pins 19 are moulded to one side leg of the guide rail 18 which has a generally C-shaped cross-section (cf. also FIG. 6), which fastening pins can be snapped accordingly into three rows of corresponding indentations 20 formed in the side walls 3, 4; to secure them in place, the fastening pins 19 have a head 19a widening in longitudinal direction of the guide rail 18. The indentations 20 are formed in narrow, optionally differently long (cf. FIG. 2) ledges 21, which in turn are moulded to the inside of rectangular, optionally (FIG. 2) differently long, holes 22 in the side walls 3, 4. In this manner, the guide rail 18 can be placed in accordance with the depth T of the items 2 at the suitable site in the magazine 1. The distance a of the indentations 20 from each other is staggered and is approximately 5, 10 and 20 mm, respectively (cf. FIG. 2).

The guide rail 18 of generally C-shape shown in FIGS. 3 and 4 and illustrated on an enlarged scale in FIGS. 5 and 6 furthermore serves to accommodate a guide ledge 23 likewise illustrated on an enlarged scale in FIGS. 7 and 8, which guide ledge—viewed from the side—is designed to be L-shaped. In the middle of the guide rail 18, a supporting area 24 for the guide ledge 23 is formed which is formed by the upper side of a transverse member 27 connecting the two legs 25, 26 of the guide rail 18, the angled end portions 28, 29 of the legs 25, 26 embracing each one of the guide ledges 23 on one lateral stepped portion 30, 31 with play so that the guide ledge 23 is longitudinally displaceable in the guide rail 18. The end portions 28, 29 in this instance are designed not to extend over the entire length of the guide ledge 23, but merely in portions over five segments, as is particularly apparent from FIG. 5 to save material.

By this arrangement, a discharge opening is formed for the lowermost item 2a, the height of the discharge opening being adaptable to the individual height H of the item 2 (cf. also FIG. 1). To fix the guide ledge 23 in the guide rail 18 at a certain level, bores 32 are provided in the transverse member 27 which bores are pair-wise arranged in rows above each other. For reasons of production, two rows of bores 32 are arranged to be symmetrical to the middle line M, wherein in each case only the bores 32 arranged below the middle line M are being used, i.e. depending on whether or not the guide rail 18—which is designed to be symmetrical to the middle line M in corresponding manner—is inserted into a "left-hand" or into a "right-hand" side wall 3 or 4, respectively, of the magazine 1.

The bores 32 serve to accommodate two pins 33 arranged one beside the other on a resilient tongue 34 of the guide ledge 23; the tongue 34 is moulded to the guide ledge 23 within a hole 35, cf. also FIG. 7. At its end, the tongue 34 comprises an outwardly angled projection 36 which serves to manually release positive connections between the pins 33 and the bores 32. As can be seen in FIG. 4, the bores 32 overlap each other in the longitudinal direction of the guide ledge 23 so that a relatively small pitch of approximately 2.5 mm can be attained for displacing the guide ledge 23. An angled end portion 37 of the guide ledge 23 extends slightly inclinedly downwardly and by its lower edge 38 defines the heigth of the discharge opening for the lowermost item 2a.

In extension of the guide ledge 23, three downwardly directed bristle bundles 39 are also formed on at the transition to the end portion 37, which form a type of "elastic curtain" for the lowermost item 2a and prevent it from sliding out of the magazine 1 inadvertently when merely a few items 2 are still contained in the magazine 1.

In FIGS. 9 and 10, one of the webs 5 is illustrated in detail; it consists, e.g., of a glass-fibre-reinforced plastics material, PA, e.g., and has V-shaped notches 42 as pre-determined breaking points on its flat sides 40, 41 at regular intervals of approximately 4 mm, which pre-determined breaking points extend transversely to its longitudinal direction. At the one flat side 41, square-shaped indentations 43 are provided in addition to the notches 42, the indentations 43 extending in pairs and also transversely to the longitudinal direction of the web 5 and being arranged at regular intervals of approximately 4 mm. Within the hollow sections 8 of the side walls 3, 4, projections 44 (cf. FIGS. 2 and 3) are shaped complementary to the indentations 43 so that a positive connection may be formed between the webs 5 and the side walls 3, 4, wedges 45 being provided to secure this connection, or to fix the same, the wedges being pushed into the hollow sections 8 above the webs 5 (cf. FIGS. 3, 4). Thus, the distance between the two side walls 3, 4 can be adjusted to the width B of items 2 with a pitch of approximately 4 mm, by simply manually breaking the webs 5 to length, which is facilitated by the brittleness of the glass-fibre-reinforced plastics material.

It has also proven suitable and cost-saving if the web 5 is produced in one piece with the two wedges 45, as is illustrated in FIG. 11, the wedges 45 being connected with the ends of the web 5 via connecting webs 46, and the wedges 45 being removable by breaking off this connecting webs 46 from the web 5.

To complement the above-mentioned partition as a consequence of the pitch of the webs 5 of approximately 4 mm, slide rails 47 of plastics material, preferably of ABS, are additionally provided which are arranged to be continuous within the side walls 3, 4 in front of the front side 6 in parallel to the guide rails 18 and fastened in the same manner as the guide rails 18, i.e. they also comprise three pins 19 which can be snapped into indentations 21 in the side walls 3, 4 in analogous manner. The thickness of the slide rails 47 is approximately 4 mm. Thus it is possible to attach one slide rail 47 either on both, the "right-hand" side wall 4 as well as on the "left-hand" side wall 3, or merely on one of the two side walls 3, 4, or on none of the side walls 3, 4, whereby an additional adaptation to the width B of the items 2 becomes possible.

As a further option for adapting the magazine 1 to the depth T of the items 2, in particular of the lowermost item 2a, an adjustment lever 48 of plastics material, PC, e.g., is provided on the rear side 6 of the magazine 1 or of the side walls 3, 4, respectively—as can be seen from FIGS. 2 and 3, which adjustment lever either is mounted capable of being snapped onto a shaft 50 either in the region of the handle 9 of the right-hand side wall 4 or of a shoulder 49 on the left-hand side wall 3 and is mounted to be pivotable about the shaft 50. For fixing the adjusting lever 48, the latter has an arm 51 projecting transversely and provided with a toothing 52 which engages in a complementary toothing 53 provided in the handle 9, or in the shoulder 49, respectively. The spacing of the toothing 52 or 53, respectively, is approximately 1.4 mm, thereby allowing for an additional fine adjustment as regards the depth T of the items 2.

In FIG. 12 a shelf is denoted by 54, in which five magazines 1 are shown, each being suspended on a section rail 12 to be downwardly inclined by about 15°, as has been explained by way of FIG. 3. In this instance, the magazine 1 preferably comprises two different sizes in terms of structural height. Below the magazines 1, also downwardly inclined guide rails 55 are mounted in each of which a carriage 56 is displaceably guided which carries a solenoid 57 having a rod-shaped core 58 (cf. also FIG. 3) that projects upwards so as to form a catch for the respective lowermost item 2a. In the activated state of the solenoid 57, its core 58 is moved upwardly to pass through the gap formed between the two lower ledges 16, 17 (cf. FIGS. 3, 4) of the two side walls 3, 4, when the carriage 56 is moved in the direction of arrow A, and to advance the lowermost item 2a towards the discharge opening—which is defined by the guide ledges 23 arranged in the side walls 3, 4, whereupon the item 2a subsequently gets to a conveyor belt 60 via a chute 59. When the lowermost item 2a has been pushed out, the solenoid 57 is de-activated, and the carriage 56 is moved back in the direction of the arrow B. The forward and rearward movement of the carriage 56 is, e.g., effected by means of a crank rod 61 hinged to the carriage 56, which crank rod is coupled with a crank disk 62, the crank disk 62 being connected with a gear motor 64 via a chain drive 63.

Above the section rails 12, reading means 65, e.g. scanners, are mounted which read a bar code printed on a card, the card being attached to the front side 7 of the magazine 1 or the side walls 3, 4, thereof, respectively. Thus, the type and number of items 2 in the magazine 1 can be identified, and these data subsequently are transmitted to a central computer (not shown). Thus, the magazines 1 can be inserted at any free sites in the shelf 54.

What is claimed is:

1. An exchangeable magazine (1) designed to be releasably inserted in a storage shelf (54) and comprising two side walls (3, 4) interconnected via webs (5), with items (2) to be stacked therebetween in superimposed manner, the side walls (3, 4) including lower, inwardly angled end portions (17) for supporting the item stack, characterized in that the mutual distance between the side walls (3, 4) is adaptable to the width (B) of the items (2) via the webs which are releasably connected with at least one side wall (3, 4), at least one guide rail (18) extending in parallel to the side walls (3, 4) and capable of engaging the item stack over the height thereof, the at least one guide rail being mounted so as to be displaceable in the direction of the depth(T) of the items (2), and a guide ledge (23) arranged within the guide rail (19) so as to be displaceable in the direction of the height (H) of the items (2).

2. An exchangeable magazine according to claim 1, characterized in that the webs (5) have pre-determined breaking points transversely to their longitudinal direction so as to obtain different lengths thereof.

3. An exchangeable magazine according to claim 1, characterized in that the webs (5) are made of glass-fiber-reinforced plastics material.

4. An exchangeable magazine according to claim 3, characterized in that the webs (5) have V-shaped notches (42) as pre-determined breaking points on at least one flat side thereof.

5. An exchangeable magazine according to claim 1, characterized in that the webs (5) have indentations (43) which can form a positive connection with corresponding projections (44) provided on the side walls (3, 4).

6. An exchangeable magazine according to claim 5, characterized in that the projections (44) are formed within hollow sections (8) at the side walls (3, 4) in which the webs (5) are insertable and fixable.

7. An exchangeable magazine according to claim 6, characterized in that the webs (5) are fixable in the hollow section (8) by means of a wedge (45).

8. An exchangeable magazine according to claim 1, characterized in that the guide rail (18) is connected with the (respective) side wall (3, 4) via snap connections.

9. An exchangeable magazine according to claim 8, characterized in that pins (19) attached to the guide rail (18) are provided as snap connections, which are each capable of being snapped into a respective indentation (20) of several rows of corresponding indentations (20) provided in the side wall (3, 4).

10. An exchangeable magazine according to claim 9, characterized in that the indentations (20) are formed in ledges (21) which are arranged in holes (22) of the side wall (3, 4).

11. An exchangeable magazine according to claim 9, characterized in that the pins (19) comprise a head (19*a*) which is widened in the longitudinal direction of the guide rail (18).

12. An exchangeable magazine according to claim 1, characterized in that the guide ledge (23) is held in its respective position within the guide rail (18) in positive connection.

13. An exchangeable magazine according to claim 12, characterized in that the guide rail (18) is formed with a generally C-shaped cross-section and comprises a transverse member (27) between its legs (25, 26) which is abutted by the guide ledge (23) and which includes bores (32) to accommodate one or several pin(s) (33) resiliently attached to the guide ledge (23).

14. An exchangeable magazine according to claim 13, characterized in that the guide ledge (23) comprises a hole (35) in which a resilient tongue (34) is arranged which carries the pin(s) (33).

15. An exchangeable magazine according to claim 12, characterized in that the guide ledge (23) is angled at its lower end, thereby forming an inclined ramp portion.

16. An exchangeable magazine according to claim 12 characterized in that bristle bundles (39) are attached at the lower end of the guide ledge (23).

17. An exchangeable magazine according to claim 1, characterized in that a slide rail (47) extending in parallel to the guide rail (18) is detachably mounted on the side wall (3, 4) in the region of the rear side (6) of the magazine (1).

18. An exchangeable magazine according to claim 1, charaterized in that at the rear side (6) of the magazine (1), an adjustment lever (48) is pivotably mounted on a shaft (5) and fixable in its position.

19. An exchangeable magazine according to claim 1, characterized in that a handle (9) is attached on at least one side wall (3, 4).

* * * * *